Nov. 5, 1935.                A. L. BAKER                2,020,229
                          FLUID PRESSURE BRAKE
                          Filed Aug. 20, 1931

Inventor
A. L. Baker,
By Harry W. Johnson
Attorney

Patented Nov. 5, 1935

2,020,229

UNITED STATES PATENT OFFICE 2,020,229

FLUID PRESSURE BRAKE

Arthur L. Baker, Fredonia, Kans.

Application August 20, 1931, Serial No. 558,390

5 Claims. (Cl. 188—72)

My invention relates to brakes, more particularly to fluid pressure brakes of the kind commonly known as air brakes, and it consists of the combinations, constructions, and arrangements herein shown and described.

The primary purpose of my invention is to provide a brake of the fluid pressure type which utilizes a minimum number of parts to accomplish its functions and which, because of the use of said small number of parts leading to a compact structure, is adapted to be utilized in any device requiring a braking action, such as a vehicle, as an automobile, street car, railway car, or a stationary machine of types too common to mention.

A further object of my invention is to provide a device of the type described that is easily taken down and set up for facilitating repairs thereto and replacement of parts.

A still further object of my invention is to provide a device of the type described which is adapted for connection to any source of fluid pressure supply.

A yet further object of my invention is to provide a device of the type described which is simple to manufacture and does not get out of order easily.

Other objects and advantages will appear as the specification proceeds and the device will be more particularly defined in the appended claims.

Figure 1:
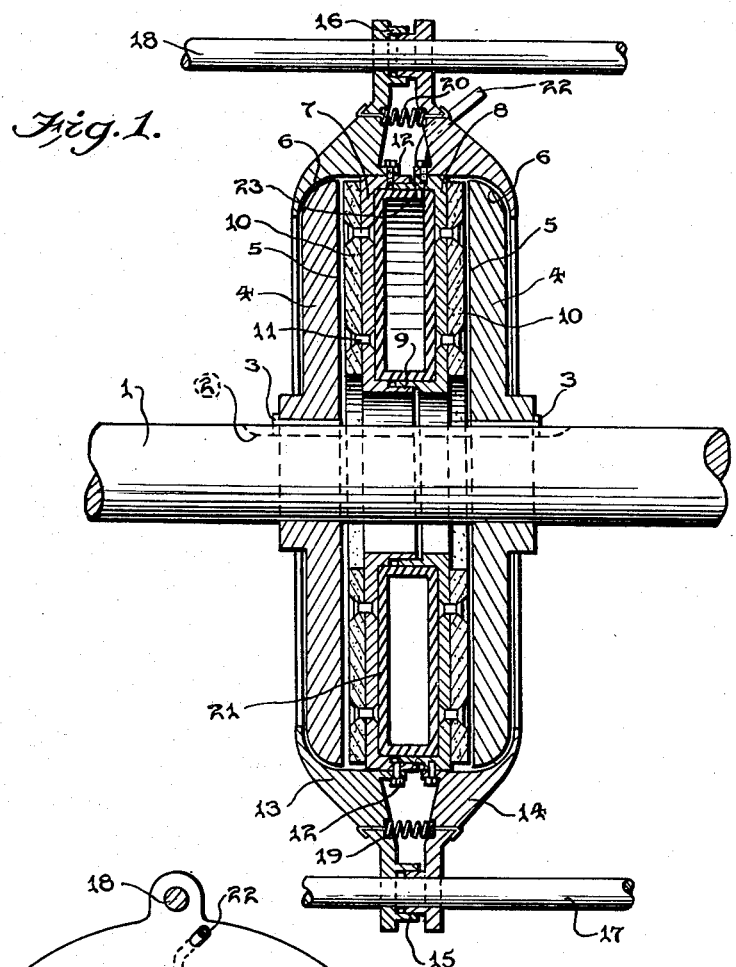
Figure 2:
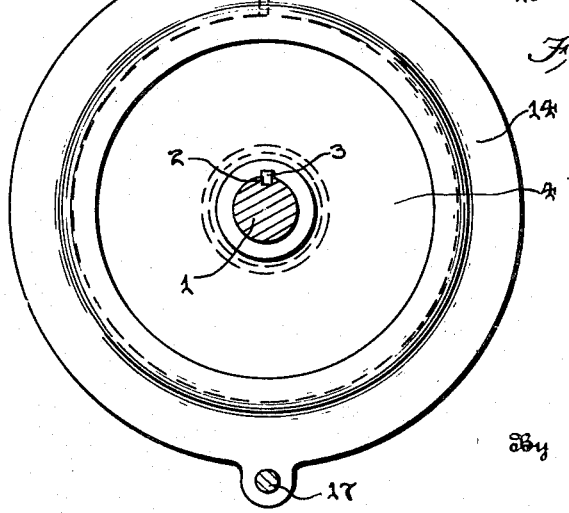

My invention is illustrated in the accompanying drawing forming a part of this application, in which Figure 1 is a sectional view of my device with parts thereof shown in elevation for clearness of illustration, and Figure 2 is a side elevational view of my device.

In this embodiment of my idea, I show the same as adapted to stop the rotation of an ordinary shaft, 1. In carrying out my invention in connection with this shaft 1, the same is provided with a key slot 2. Fixedly mounted on this shaft 1 by means of keys 3, positioned in the keyway 2, are friction disks 4, which may have their inner surfaces 5 roughened or coated with a friction material, (not shown) if desired. They have curvilinear outer edges, 6, as can readily be discerned from an examination of Figure 1. These members constitute one of the portions of my brake.

For engagement with the inner surfaces of these friction disks, 4, for stopping rotation thereof and consequently stopping the rotation of shaft 1 when desired, I provide a pair of annular members, 7 and 8, telescopically engaged as indicated at 9, for relative axial movement to one another, and provided with friction surfaces, 10, on their outer walls by means of fasteners 11. These members are connected by means of the stud bolts or similar fasteners 12, to the annular housing members 13 and 14, this connection making the housing members 13 and 14 substantially integral with the members 7 and 8 respectively. The members 13 and 14 also telescopically engage with one another as indicated at 15 and 16. They are mounted in position by means of the stationarily positioned shafts 17 and 18, engageable through the telescoping portions 15 and 16. They are further normally urged inwardly towards one another by the resilient means, consisting of the springs 19 and 20.

For moving the members 7 and 8 outwardly to bring their frictional surfaces 10 into engagement with the friction walls 5 of the members 4, to stop the rotation of the shaft, an expansible member 21, not unlike the inner tube of an automobile tire, is encased within said members. It may be constructed of rubber or any other suitable material adapted to carry out the functions necessary for the operation of my device. It is equipped with a fluid inlet and outlet, 22, having a valve therein substantially similar to the valve of an inner tube. This member 22 projects through an aperture 23 in the member 8, so positioned that interference of the edge of the member 7 therewith does not occur.

From the foregoing description, the use and operation of my device is easily understood. The apparatus is set up as just described, the bolt connections between the members 7 and 8, and 13 and 14, respectively, allowing assembly and disassembly of the parts.

When it is desired to operate the brake, fluid is admitted through the member 22 to the expansible member 21 from a source of fluid supply by any suitable fluid control means (not shown) desired, the desired braking pressure being regulated by this fluid control means. It can easily be understood that expansion of the member 21 will force the members 7 and 8 outwardly to engage with the disks 4 to stop the rotation of the shaft 1.

When it is desired to permit rotation of the shaft 1, it is only necessary to release the pressure in the expansible member 21 by the fluid control means, and the parts will be retracted into the inoperative position by means of the springs 19 and 20.

It can easily be understood from the description of the parts that the expansible member will be well encased in the telescoping members during all periods of operation, so that protection of the same will be assured.

It is thus seen that I have provided a brake that is well adapted to stop the rotation of any desired shaft without modification thereof; that is compact and consists of a limited number of parts; that can readily be assembled and disassembled for repair and replacement of parts, and that is so adapted to contain the part that is most subject to deterioration, namely, the expansible member, that said expansible member will be afforded the greatest possible protection.

What I desire to claim and secure by Letters Patent is:

1. In combination with a rotatable member, friction members rotatable with said member, cooperating friction members telescopically engaged with one another, a housing comprising a pair of telescopically engaging portions each of which portions is attached to one of the second-named friction members, and fluid pressure means for forcing the second-named friction members into cooperating engagement with the first-named friction members.

2. In combination with a rotatable member, friction members rotatable with said member, cooperating friction members telescopically engaged with one another, and fixedly positioned against rotation relative to said first-named friction members and within said friction members, a housing attached to the second-named friction members, said housing having parts telescopically engageable with each other, and fluid pressure means for forcing the second-named friction members into cooperating engagement with the first-named friction members.

3. In combination with a rotatable member, friction members rotatable with said member, cooperating friction members telescopically engaged with one another, a housing attached to the second-named friction members, said housing having parts telescopically engageable with each other, resilient means attached to said housing to normally urge said housing parts into juxtaposition and fluid pressure means for forcing the second-named friction members into cooperating engagement with the first-named friction members.

4. A brake comprising a pair of friction members for movement with the member to be stopped, a second pair of friction members telescopically engaged with one another and fixedly positioned against rotation relative to said first-named pair of friction members, a housing attached to the second-named friction members, said housing having parts telescopically engageable with each other, an expansible member positioned within and between the second named pair of friction members, means for supplying fluid pressure to said expansible member for moving the second-named pair of friction members into engagement with the first-named pair of friction members for stopping the movable member, and resilient means attached to said housing for withdrawing said second-named pair of members from the first-named pair of members upon release of pressure in the fluid system.

5. In combination with a rotatable member, friction members rotatable with said member, cooperating friction members positioned within said first named members and non-rotatable relative thereto, housing members telescopically engaged with one another, connected to said second named members and extending about said first named members, and means for forcing said second named members into engagement with said first named members.

ARTHUR L. BAKER.